Patented Nov. 21, 1950

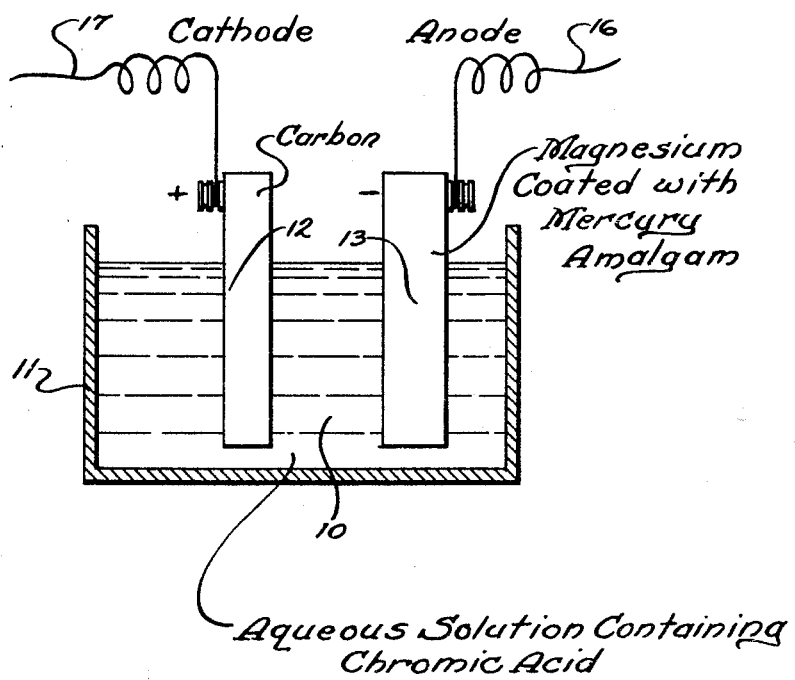

2,530,751

UNITED STATES PATENT OFFICE 2,530,751

PRIMARY CELL

Edward L. Anderson and Lulu B. Anderson, Los Angeles, Calif., assignors of one-half to Gladys H. Bucklin, Fresno, Calif.

Application July 28, 1947, Serial No. 764,100

4 Claims. (Cl. 136—100)

This invention is concerned generally with electromotive force primary cells or batteries by which electrical energy can be generated at the expense of a chemical reaction. More particularly the invention relates to a new type of primary cell in which the negative electrode or anode is composed primarily of magnesium metal.

Previous to the present invention attempts to use the chemical energy of magnesium metal as a source of electrical energy have encountered the difficulty that the surface of the magnesium electrode rapidly became coated with a substance which inhibited further chemical action. The production of this substance at the electrode can be considered as a form of polarization. Previous attempts to overcome this difficulty, for example by the use of an electrolyte containing hydrochloric or phosphoric acid, resulted in a battery with an excessively short life, even on open circuit, since the magnesium electrode was attacked by the acid even when no current was allowed to flow.

We have discovered that these difficulties can be avoided and a satisfactory magnesium primary cell can be made by providing a small quantity of mercury in association with the magnesium electrode and available to the electrode surface. Mercury is preferably provided as a layer of mercury-magnesium amalgam covering at least that portion of the magnesium electrode surface which is in contact with the electrolyte. The mercury prevents the formation on the electrode of any current inhibiting coating, and results in stable and uniform operation of the battery throughout its life. The mercury on the electrode apparently acts only as a physical coating protecting the anode, or possibly as a catalyst, since it is not itself exhausted. As the magnesium of the electrode is consumed by the chemical action of the cell, the original amalgam coating remains on the electrode surface and performs its function of maintaining the surface in an active condition.

The electrolyte of our magnesium cell is preferably an aqueous solution of chromic acid, which acts as an effective depolarizer of the cathode, as will be explained more fully. The second electrode, or cathode, may be formed of any conducting substance which is stable toward chromic acid and toward other constituents of the electrolyte, if any; that is, which is not attacked by the electrolyte whether current is flowing or not. For example, platinum, aluminum or chromium-plated steel can be used as cathode. For practical reasons we prefer to construct the cathode of carbon or graphite, since this is relatively inexpensive and results in a relatively high battery voltage.

A primary cell in accordance with the invention and comprising the preferred system:

$$Mg/H_2CrO_4/C$$

has been found to maintain a potential difference between the electrodes of approximately 1.5 volts when an open circuit, and to maintain an electromotive force of approximately 1.25 volts for as long as 60 hours when discharging steadily at a current of 10 amperes per square foot of anode surface.

Among the advantages of a primary cell constructed in accordance with the invention is the fact that it has a remarkably long life on open circuit, or shelf life, and yet can be used continuously without showing appreciable downward drift of its electromotive force. Since only a single electrolyte is required, there is no porous cup in the cell and the resistance is correspondingly low. Because of the lightness of the metal magnesium (about 1 lb. per 1000 ampere-hours, compared with more than 2.6 lbs. for zinc), a magnesium primary cell with a given ampere-hour capacity can weigh considerably less than a corresponding cell of conventional type.

A complete understanding of our invention and of its further objects and advantages will be had from the following description of a preferred embodiment, which however, is intended as an illustrative example and is not to be construed as limiting the scope of our invention.

This description is to be read with reference to the accompanying drawing, which is a schematic representation of a preferred embodiment of the invention.

The body of electrolyte 10 is contained in a suitable vessel 11, which may for example be of glass, or which may be formed from one of the electrodes. An electrode 12 of carbon is partially immersed in the electrolyte, being supported by any suitable means, not shown. A second electrode 13, consisting primarily of magnesium metal, is similarly partially immersed in electrolyte 10 in a position which is preferably close to carbon electrode 12, but which allows no direct contact of the two electrodes. Electrical connections to the anode and cathode are indicated respectively at 16 and 17.

As shown, electrolyte 10 is an aqueous solution containing chromic acid. The concentration of chromic acid in the electrolyte is not critical, and can vary over a wide range. For example, a saturated solution can be used, and crystals of chromic trioxide may be added in excess to form a thick paste, resulting in a form of "dry" battery. For normal service we prefer to use an electrolyte containing chromic acid in a concentration of approximately 20 per cent. This is sufficiently concentrated to give good depolarizing action at the cathode for normal currents, and is relatively economical in first cost. Other solutes which do not react directly with other substances present can be included in the electrolyte if desired, but we prefer to make up the electrolyte by simply adding chromic trioxide to water.

Preparation of the magnesium electrode in accordance with our invention can be accomplished very simply by first cleaning the metal surface with a 5 per cent solution of sulfuric acid and then rubbing a few drops of mercury over the surface with a wet cloth. The electrode is then washed in clear water. This leaves a thin coating of mercury-magnesium amalgam over the surface of the electrode, giving a distinctive shiny appearance. Although only a surface film containing mercury is needed, a deeper layer may be used, or the mercury may be distributed throughout the magnesium of the anode. The magnesium or magnesium amalgam of the anode can be supported if desired upon a core of structural material, in a manner similar to that sometimes used in conventional batteries.

When an external electrical connection is provided between the two electrodes of the battery, allowing current to flow, hydrogen is released at the carbon cathode in the usual manner, and is at once oxidized to water by the chromic acid of the electrolyte. The hydrogen is thus prevented from collecting around the electrode and polarizing the battery. This depolarizing action of the chromic acid can probably be represented by:

$$H_2 + 2CrO_4 = \rightarrow Cr_2O_7 = + H_2O \quad (1)$$

At the magnesium anode magnesium atoms enter the solution as positive ions. In the absence of a depolarizing agent at the anode surface, an insoluble compound, probably MgO, is formed, which rapidly coats the anode and brings the reaction to a stop. When mercury is present at the electrode surface, the anode does not become so coated. One possible explanation of that action is that the mercury diffuses under the insoluble compound as it forms on the anode surface, and causes it to flake off. Such an explanation is supported by observation of a fine dust which settles to the bottom of the electrolyte below the anode and which may be MgO. Another possible explanation appears to be that the mercury acts as a catalyst for a reaction by which the insoluble magnesium compound is changed into a soluble compound, so that the anode surface is not contaminated. If the insoluble compound is MgO, as suggested above, the catalyzed reaction at the anode can probably be represented by:

$$\overset{Hg}{MgO + Cr_2O_7 = \rightarrow MgCrO_4 + CrO_4 =} \quad (2)$$

The chromate which is reduced according to equation (1) would then be re-oxidized according to equation (2), preserving an over-all balance of electrolyte, except for the gradual replacement of chromic acid by magnesium chromate represented in (2). Such a production of magnesium chromate is indicated by the gradual change of the electrolyte solution from the red color characteristic of chromic acid to blue.

A great advantage of a primary cell in accordance with the invention is that there is virtually no local chemical action within the cell when current is not flowing. In most conventional batteries, particularly those which employ a single electrolyte, it is necessary to take special precautions to reduce local action to a minimum. For example, the zinc electrode of some cells is coated with mercury amalgam in order to reduce local action. In our cell the problem of local action does not arise, since magnesium is not soluble in chromic acid. Our treatment of the anode with mercury is not related to the problem of preventing local action while the battery is on open circuit, but rather has the function of preventing a form of polarization of the cell when it is in operation.

We claim:

1. A primary electric cell comprising a body of electrolyte containing chromic acid, first and second electrodes in contact with the body of electrolyte, one of the electrodes comprising a body of magnesium metal, at least a surface portion of the said electrode having mercury associated with the magnesium.

2. A primary electric cell comprising a body of electrolyte containing chromic acid, first and second electrodes in contact with the body of electrolyte, one of the electrodes being composed primarily of magnesium metal, and a layer of mercury-magnesium amalgam at the surface of contact between the said electrode and the electrolyte.

3. In a primary electric cell which comprises a body of electrolyte containing chromic acid, and an anode composed primarily of magnesium metal and in contact with the body of electrolyte; means for depolarizing the anode when current is drawn from the cell, said depolarizing means including a film of mercury at the interface between the anode and the body of electrolyte.

4. In a primary electric cell comprising a body of electrolyte composed primarily of an aqueous solution of chromic acid, and a magnesium anode in contact with the body of electrolyte; a depolarizing agent at the interface between the anode and the electrolyte, said depolarizing agent comprising mercury amalgamated with the magnesium of the anode.

EDWARD L. ANDERSON.
LULU B. ANDERSON.

REFERENCES CITED

The following references are of record in the file of this patent:

UNITED STATES PATENTS

| Number | Name | Date |
| --- | --- | --- |
| Re. 22,053 | Ruben | Mar. 24, 1942 |
| 1,771,190 | Polcich | July 22, 1930 |
| 2,301,390 | Forsythe | Nov. 10, 1942 |

OTHER REFERENCES

Barbian et al., Trans. Electrochemical Socy, vol. 91 (1947), pages 393, 394.

Magnusson, C. E., Direct Currents (1929), page 406.

Hoxeng et al., Corrosion, June 1947, page 268, first complete paragraph.